Dec. 22, 1959 W. F. S. CHITTLEBURGH ET AL 2,918,529

TELEGRAPH REGENERATIVE REPEATERS

Filed June 17, 1957 3 Sheets-Sheet 1

Inventors
W. F. S. CHITTLEBURGH - T. H. WALKER - A. JESSOP
By Albert Rees
Attorney

*Inventors*
W.F.S. CHITTLEBURGH - T.H. WALKER - A. JESSOP
By Albert Rees
*Attorney*

Dec. 22, 1959 W. F. S. CHITTLEBURGH ET AL 2,918,529

TELEGRAPH REGENERATIVE REPEATERS

Filed June 17, 1957 3 Sheets-Sheet 3

Inventors
W. F. S. CHITTLEBURGH - T.H. WALKER - A. JESSOP
By Albert Ross
Attorney United States Patent Office 2,918,529

Patented Dec. 22, 1959

2,918,529

TELEGRAPH REGENERATIVE REPEATERS

William Francis Sidney Chittleburgh, Thomas Harold Walker, and Anthony Jessop, all of London, England, assignors to International Standard Electric Corporation, New York, N.Y.

Application June 17, 1957, Serial No. 666,073

Claims priority, application Great Britain June 29, 1956

9 Claims. (Cl. 178—70)

The present invention relates to telegraph regenerative repeaters for start-stop systems.

Besides simply regenerating the received character signals, a regenerative repeater has frequently to meet a number of other requirements, and various arrangements have already been proposed in which some of these requirements have been satisfactorily dealt with.

Although during normal transmission, the idle or stop condition is the condition in which marking potential is applied to the telegraph circuit, it frequently happens that the circuit, when out of use, is in the spacing condition during which spacing potential is applied for relatively long periods to the circuit. This is known as the "long space" condition. It is necessary that the regenerative repeater shall be able to accommodate this condition and to work normally as soon as the normal idle or marking condition is resumed. Furthermore, when the telegraph circuit is subjected to excessive interference or fading, sometimes the stop signal corresponding to a character may be lost, and to avoid the resulting confusion at the receiving end, it is frequently desired that the regenerative repeater shall insert a stop signal at the proper time irrespective of whether or not one was received. These two requirements are to some extent contradictory and have not hitherto been provided simultaneously in the same regenerative repeater.

The principal object of this invention, therefore, is to resolve the contradiction, so that both these facilities may be available in the same telegraph repeater.

When the telegraph circuit is subjected to excessive interference, a signal simulating a start signal may be produced. It is therefore a secondary object of the invention to provide also means for rejecting such false start signals in combination with the facilities forming the principal object of the invention.

The said principal object is achieved according to the invention by providing a telegraph regenerative repeater for start-stop binary code systems comprising means for repeating at correctly timed instants an incoming code group of signal transitions representing a character to be transmitted, means for inserting an outgoing stop signal at the proper time after the re-transmission of the start signal, irrespective of whether or not an incoming stop signal is received, means for detecting the presence of marking signals during the period between the instant of the start signal and the said proper time, and means operating in response to the absence of any marking signals during the last-mentioned period for preventing the insertion of the said outgoing stop signal.

The invention also provides a telegraph regenerative repeater for start-stop binary code systems comprising means for retransmitting at correctly spaced instants, incoming signal transitions representing a character to be transmitted according to the code, and arrangements including means for detecting the presence of a marking signal during the character period following the receipt of a start signal, and means responsive to the detection of the said marking for inserting an outgoing stop signal at the proper time irrespective of whether or not an incoming stop signal is received.

The invention further provides a telegraph regenerative repeater for start-stop systems in which a character is transmitted during a period divided into $n+1$ equal element periods consisting of $n$ code element periods, during which the telegraph circuit may be in the marking or spacing condition according to the code, preceded by a start period, during which the circuit is in the spacing condition, comprising generating means for producing timing pulses for controlling the timing of the outgoing regenerated signals, means operating in response to a start signal for starting the said generating means, means arranged to stop the said generating means only if the start condition persists for less than a given fraction of an element period, means arranged to insert an outgoing stop signal at the proper time irrespective of whether or not an incoming stop signal is received, only if the said start condition lasts for more than the said given fraction and is also followed by at least one marking period before the said proper time, means for preventing the insertion of the said outgoing stop signal if the start signal commences a long space condition wherein no such marking period follows the start signal, and means for stopping the said generating means before the arrival of the next start signal.

The invention will be described with reference to the accompanying drawings, in which.

Figure 1:
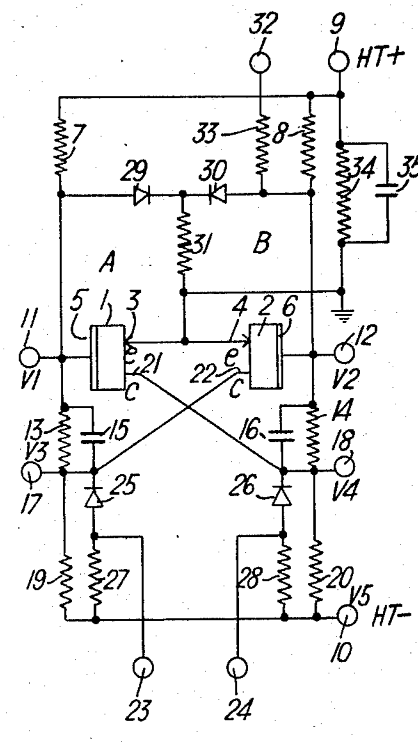
Fig. 1 shows a schematic circuit diagram of a binary counting device used in the telegraph regenerative repeater according to the invention.

In order to make the description of the invention clear, some conventions and technical terms which will be employed will be first explained. In a start-stop telegraph system, the signals are transmitted by transitions between two conditions of the line current. In single-current system, the two conditions are respectively current and no current, while in the double-current system, the conditions are respectively positive current and negative current of equal value. One of the two conditions in each system is chosen as the marking condition, in which the circuit remains in the idle or stop condition. The other condition is the spacing condition.

A transition from the marking condition to the spacing condition will be called a "spacing signal," and the opposite transition will be called a "marking signal." For clearness it will be assumed in this specification that the telegraph repeater operates on the double-current system, and that the marking condition is negative current (or voltage).

Start-stop systems usually employ a five-element binary code, and the transmission of a character takes place during a period to be called a "character period" which is divided into five equal sub-periods called "elements periods" preceded by a start period of the same duration as an element period. The character period is followed by a stop period. During each of the element periods, the circuit may be in the marking or spacing condition according to the code, while during start and stop periods, the current is in the spacing and marking condition respectively.

At the end of the fifth element period, the circuit always returns to the stop or marking condition. The stop period is not less than one element period, though in some cases the minimum length is 1½ element periods. The telegraph repeater to be described below is designed for a stop period of one element period, and so it will also operate satisfactorily for systems employing the 1½ element period for the stop condition.

The telegraph repeater will be assumed to operate at a speed of 50 bauds, in which the duration of an element period is 20 milliseconds, so that a complete character period is 120 milliseconds. It will be understood that the invention is not restricted to a five-element code nor to a speed of 50 bauds, and it will be obvious to those skilled in this art how the circuit described should be modified for other codes and speeds.

While it has been assumed above that the stop condition, when the circuit is temporarily idle, is the marking condition, in some telegraph exchange systems, when a telegraph circuit is unseized, that is, is not connected to any terminal apparatus, the circuit is in the spacing condition, but returns to the marking or stop condition on being seized. This spacing condition may last for long periods and will be referred to as the "long space" condition.

The telegraph regenerative circuit to be described below with reference to Fig. 4 in order to illustrate the invention, makes use of a number of substantially identical switch circuits each of which is a two-condition bi-stable trigger circuit of known type commonly used as a frequency dividing stage which divides by two, and which for convenience will be called a "binary." It will be convenient to describe this circuit and a minor modification thereof shown respectively in Figs. 1 and 2, before describing the complete regenerative repeater current.

Referring to Fig. 1, the binary comprises two similar transistors 1, 2 the emitter electrodes 3 and 4 of which are connected directly to ground. The base electrodes 5, 6 are respectively connected through equal resistors 7, 8 to the positive terminal 9 for the operating source (not shown), the negative terminal of which is 10. The base electrodes 5, 6 are connected directly to corresponding terminals 11, 12 which are used as triggering or control terminals. Terminals 11, 12 are respectively connected through equal resistors 13, 14 shunted by capacitors 15, 16 to two terminals 17, 18 which are generally (but not always) used as output terminals. Terminals 17, 18 are respectively connected to terminal 10 through equal resistors 19, 20. The collector electrodes 21, 22 of the transistors 1, 2 are cross-connected as shown to terminals 18 and 17 respectively.

Two alternative input terminals 23, 24 are connected through respective rectifiers 25, 26 to terminals 17 and 18, and through respective equal resistors 27, 28 to terminal 10. The rectifier 25 or 26 is directed so that it will be unblocked when terminal 23 is positive to terminal 17, or when terminal 24 is positive to terminal 18. The rectifiers 25 and 26 prevent pulses from being transmitted back from the binary to the sources connected to terminals 23 and 24.

Two rectifiers 29, 30 respectively connect terminals 11 and 12 to ground through a common resistor 31. Rectifier 29 (or 30) is directed so that it is unblocked when terminal 11 (or 12) is positive to the upper end of resistor 31. A resetting terminal 32 is connected through a resistor 33 to terminal 12.

For a reason to be explained later on, terminal 9 is connected to ground through a small resistor 34 (for example, about 50 ohms) shunted by a large capacitor 35 (for example, about 30 microfarads). Since all the binaries in the circuit of Fig. 4 will be operated from a common direct current source, only one pair of elements 34, 35 is provided, and not one for each binary.

For clearness, it will be assumed that the odd numbered terminals 11, 17, 23 and the elements associated therewith relate to the A side of the binary, and the terminals 12, 18, 24 and the elements associated therewith relate to the B side. In the circuit of Fig. 4, in the stop condition, all binaries are in the condition called the B condition such that the B side transistor 2 is conducting and the A side transistor 1 is cut off. In this condition, the base electrode 6 and terminal 12 are at a potential negative with respect to ground. The collector current of the transistor 2 flows through the resistor 19 and causes the potential of the base electrode 5 of the A side transistor 1, and the terminal 11, to be positive with respect to ground so that the transistor 1 is cut off and there is substantially no collector current. The binary may be switched over to the opposite or A condition by applying a positive potential to the base electrode 6 sufficient to raise it to a potential above ground potential, thereby blocking the B-side transistor 2, and also unblocking the A-side transistor 1, on account of the disappearance of the collector current flowing through resistor 19. On removal of the switching potential, the binary remains in the A condition because the collector current from the A transistor 1 now flows through resistor 20 and maintains the potential of the base electrode 6 above ground potential.

Switching from the B condition to the A condition may alternatively be done by applying a suitable negative potential to the base electrode 5 of the A transistor 1. Since the circuit is symmetrical, it is obvious that switching back from condition A to condition B may be done by applying a positive potential to the base electrode 5.

Positive switching potentials may be applied directly to either base electrode at terminal 11 or 12, or from terminal 23 or 24 through the rectifier 25 or 26 and capacitor 15 or 16 according to circumstances. These switching potentials are in the form of short positive pulses unless otherwise stated.

When it is desired to restore the binary to the normal or B condition, a steady negative resetting potential is applied to terminal 32, which holds the base electrode 6 below ground potential, and thus holds the transistor 2 in the conducting condition. The binary cannot be triggered until the resetting potential is removed.

From the above explanation of the operation of the binary, it is clear that the base electrode of either transistor must be negative to the emitter electrode (that is, negative to ground) when it is conducting, and positive to ground when it is cut off. Since the potential of the base electrode with respect to ground depends on the potentials with respect to ground of the terminals 9 and 10 of the high tension source, it is necessary to fix these potentials in order that the above conditions may be satisfied. This is done by connecting the terminal 9 to ground through the elements 34 and 35 already mentioned.

When the binary is in the B condition, the potentials of terminals 11 and 12 with respect to ground will be denoted as V1 and V2, where V1 is greater than V2 (that is, V1 is more positive than V2). Actually, since transistor 1 is blocked and transistor 2 is conducting, V1 will be positive to ground and V2 will be negative to ground, as already stated. The potentials of terminals 17 and 18 with respect to ground will be denoted as V3 and V4, where V3 is slightly greater than V2 (that is, more positive) and V4 is very much lower than V3. Clearly, since the circuit is symmetrical, when the binary is switched to the A condition, the potentials of terminals 11 and 12 and also of terminals 17 and 18 will be interchanged.

The potentials V1 to V4 have been marked in Fig. 1. The potential of the negative H.T. terminal 10 with respect to ground is denoted V5, and typical values of these potentials in volts for the B condition of the binary are given below:

$$V1=+1$$
$$V2=-0.3$$
$$V3=-0.1$$
$$V4=-10.7$$
$$V5=-13.5$$

Thus it is clear that the potentials of both terminals 12 and 18 will increase at the moment of switching from the B condition to the A condition. For convenience the output from terminal 12 or 18 will be referred to as the B output. In the same way the A output from terminal 11 or 17 consists in a potential increase when the binary is switched from the A to the B condition.

It may be mentioned that the rectifiers 29 and 30 are used to limit the maximum value V1 of the base potential of either transistor to the value determined mainly by the resistor 31, the potential of terminal 9 having been already fixed by the elements 34 and 35. When one base electrode is at potential V2, the corresponding transistor is unblocked and the other is blocked.

Figure 4:
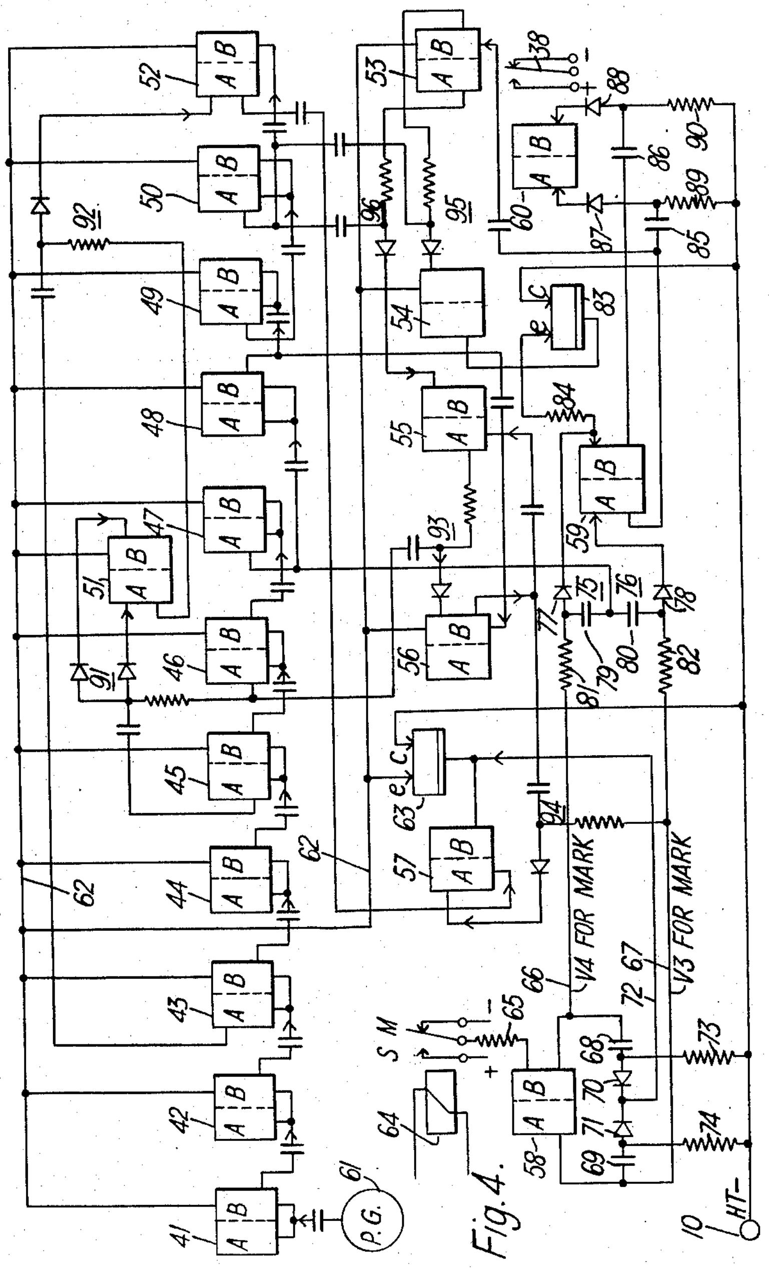
Fig. 4 shows a block schematic circuit diagram of a telegraph regenerative repeater according to the invention.

It will be understood that all the external terminals of Fig. 1 are not necessarily used in the case of any particular binary in the circuit of Fig. 4, and this may enable certain of the circuit elements associated with the terminals not used to be omitted. Also, in a number of cases, positive trigger pulses will be applied simultaneously to both terminals 23 and 24, in which case one of the resistors 27, 28 can be omitted.

It should be pointed out that when the binary has been switched to the opposite condition by a positive pulse applied to the base electrode of the transistor which is conducting, additional positive pulses applied to the same base electrode can have no further effect. When, however, a train of positive pulses is applied simultaneously to both terminals 23 and 24, successive pulses switch the binary backwards and forwards between the A and B conditions because the rectifiers 25 and 26 are alternately blocked and unblocked in such manner that each pulse is always directed to the base electrode of the transistor which is conducting.

Figure 2:
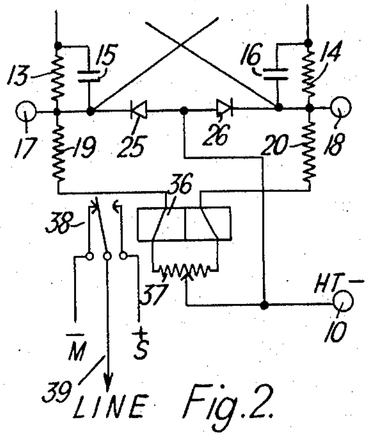
Fig. 2 shows a modification of part of Fig. 1.

Fig. 2, shows the manner in which the lower part of Fig. 1 is modified in the case of the binary used for operating the output relay of the regenerative repeater in Fig. 4. The upper part of Fig. 1 not shown in Fig. 2 is unaltered except that elements 32 and 33 are omitted, since no resetting is required. In Fig. 2, resistors 19 and 20 are connected through respective equal windings of a polarised relay 36 to opposite ends of a potentiometer 37, the movable contact of which is connected to terminal 10, to which also are connected both the rectifiers 25 and 26. The relay winding controls a set of change-over contacts 38 the movable spring of which is connected to the outgoing line and the fixed springs of which are connected to negative and positive fixed sources as indicated. The two windings of the relay 36 are connected in such manner that the currents flowing from resistors 19 and 20 produce opposite fluxes in the relay core. When the binary is in the B or marking condition, the current through the right hand winding of the relay will be smaller than that through the left hand winding, and the line 39 is then connected to the negative marking source as shown. When the binary is switched to the A or spacing condition, the currents through the relay windings are interchanged, and the contacts 38 then change over so that the line 39 is now connected to the positive spacing source.

When the currents through the relay windings are interchanged, rather large voltage pulses are generated in the windings which may damage the transistors. The rectifiers 25 and 26 accordingly act as limiters to prevent the potentials of terminals 17 and 18 from falling below the potential V5 of terminal 10.

The potentiometer 37 is provided to permit slight differences in the currents from the A and B sides of the binary to be adjusted so that the relay 36 operates without bias.

In Fig. 2, the terminals 17 and 18 are used as input terminals.

Figure 3:
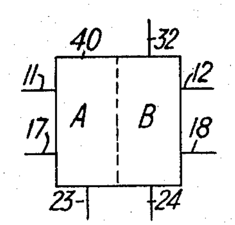
Fig. 3 shows a block representation of a binary counting device.

In Fig. 4 each binary will be represented by a square block with conductors leading to and from it. In order to avoid the complications resulting from numbering all these conductors, Fig. 3 has been provided to show an example of one of these blocks representing a binary. The block 40 shown in Fig. 3 is divided by a vertical dotted line into two sections designated A and B, and corresponding to the A and B sections of Fig. 1 or 2. The conductors connected to the sections A and B are shown in the same relative positions as the correspondingly numbered terminals of Fig. 1 or 2, and will be shown in the same way in Fig. 4, but without the numbers, so that it will be easy to see at once which terminals are being used, from the relative positions of the conductors.

The regenerative repeater circuit shown in Fig. 4 comprises twenty binaries designated 41 to 60 respectively, all except No. 60 having the circuit shown in Fig. 1. Binary No. 60 has the circuit of Fig. 1 modified in accordance with Fig. 2.

The binaries 41 to 50 form a counting chain controlled by a pulse generator 61, which chain produces positive trigger pulses and control potentials at the desired times, as will be explained below. As has already been pointed out, when any binary is switched from one condition to the other, a change of potential is produced at any given output terminal. This potential change is sometimes used for opening or shutting a gate circuit, and sometimes for triggering another binary. In the former case, the corresponding output terminal is usually connected to the gate circuit through a suitable resistor, while in the latter case a short trigger pulse is derived from the potential change by means of a capacitor. The necessary resistors and pulse capacitors are shown in Fig. 4 but are not always designated, and it will therefore be easy to see whether a trigger pulse or a control potential is being used. The conductors conveying trigger pulses are marked with arrows to show which way the pulses are supplied.

The arrangements are such that a positive trigger pulse is always needed to change the condition of a binary, and it has already been explained that a positive potential change occurs at a B output of a binary when it is switched from the B to the A condition, and a positive potential change occurs at an A output when it is switched from the A to the B condition. So, positive trigger pulses are obtained from the B side when switching from B to A and from the A side when switching from A to B.

The pulse generator 61 supplied short positive trigger pulses with a repetition frequency of 6,400 pulses per second to both sides of the binary 41. Each pulse, therefore, blocks the conducting side of the binary by the action of the rectifiers 25, 26 (Fig. 1) and successive pulses, therefore, switch the binary 41 alternately between the two conditions as already explained, so that it divides by two in the known way. Each binary up to and including 46 operates the next one in the same way, so that at the B output of binary 46 positive trigger pulses are produced with a repetition period of 10 milliseconds, after a total frequency division by 64.

Since initially all binaries are in the B condition, positive trigger pulses will be obtained from the B output of any binary at times $2(n-1t)$ and from the A output at times $(2n-1)t$, where $t$ is the repetition period of the input trigger pulses, and $n$ is any integer, zero time being reckoned from the time of the first input pulse. Thus the first trigger pulse from the generator 61 will switch over all the binaries 41 to 46 substantially simultaneously, and pulses will be obtained from the B output of 46 at times 0, 10, 20, 30 etc. milliseconds.

It will be noted, however, that the A outputs of binaries 47 and 49 are used for switching 48 and 50, respectively, while the B output of 48 is used for switching 49. The consequences of these modifications can best be understood from the graphs of Fig. 5.

In these graphs the potential variations at the A or B output of certain of the binaries are shown to a time scale, each graph being designated by the number of the binary concerned and A or B, according to the output represented. The last three graphs are to one quarter the time scale of the others, and the graph 47A appears in both graphs.

Graph 42B represents the trigger pulses at the B output of the binary 42, and these are spaced apart by 0.625 milliseconds, since a frequency division by 4 is produced by the two binaries 41 and 42. The zero of the time scales coincides with the first of the trigger pulses from 42. Graph 43B shows the variation of potential of terminal 18 of Fig. 1, for binary 43, and the corresponding positive trigger pulses are indicated by arrows. Graph 46B shows the B output of binary 46 after a further frequency division by 16, the trigger pulses being produced at 0, 10, 20, 30 etc. milliseconds as already stated. From graph 47A it can be seen that the first A output pulse now coincides with the second trigger pulse from 46B at 10 milliseconds, and subsequent output pulses are at 30, 50, 70 etc. milliseconds. These are shown again on the smaller scale in the lower group of graphs. The first pulse from the B output of 48 will coincide with the first pulse from 47A at 10 milliseconds and subsequent pulses at 50, 90 130 etc. milliseconds. The first pulse of the output of 49 then coincides with the second pulse from 48B at 50 milliseconds, and subsequent pulses at 130, 210 etc. milliseconds. Likewise the first pulse of the A output of binary 50 coincides with the second pulse from 49A at 130 milliseconds and the next one at 290 milliseconds, but this is not shown and is not used.

In the preceding description of the counting chain, it has been assumed that it is operating; actually, in the idle or stop condition of the repeater, all of the binaries except 55 and 57 to 60 are held in the B condition by a negative potential applied to the resetting conductor 62 by a transistor 63, and are not released until a start signal is received.

The incoming signals are received by a relay 64 (or some equivalent device) and in the idle or stop condition, which is the marking condition, the relay 64 applies negative marking potential through a resistor 65 to the B side of the binary 58 (to terminal 12, Fig. 1) and thus holds this binary in the marking condition, with the B side conducting. Two control conductors 66 and 67 are respectively connected to the B and A outputs of the binary 58, and in the marking condition will be at potentials V4 and V3 respectively, so that 66 is negative to 67. The B and A outputs are also connected through capacitors 68, 69 and rectifiers 70, 71, to a common trigger conductor 72 which is connected to the B side of binary 57 (terminal 18, Fig. 1) and to the base electrode of the transistor 63. The junction points of elements 68, 70 and elements 69, 71 are connected to the negative high tension terminal 10 through equal resistors 73, 74. The emitter electrode of the transistor 63 is connected to the resetting conductor 62 and the collector electrode to terminal 10. This terminal, and also terminal 9 and ground are of course also connected to all the binaries in the manner shown in Fig. 1, but these connections are not shown in Fig. 4 to avoid complicating the drawing.

The binary 57 being initially in the B condition, the base electrode of the transistor 63 will be held at potential V4 which is below the potential of its emitter electrode, so that it is unblocked. A negative potential is therefore applied to the resetting conductor 62 through the transistor 63 from terminal 10, and this negative potential is sufficient to hold all the binaries connected to conductor 62 in the B condition.

When a start signal is received, the relay 64 changes over and applies positive spacing potential to the binary 58 which switches it over to the spacing condition, and at the same time transmits a positive trigger pulse over conductor 72. This switches the binary 57 into the A condition, thus blocking the transistor 63 and cutting off the resetting potential. The counting chain now starts operating in the manner described, and zero time is determined by the first pulse from the generator 61 which appears after relay 64 has changed over.

The binary 59 is switched by positive trigger pulses to be called "timing pulses," from the A output of the binary 47. (See graph 47A, Fig. 5.) These pulses are supplied through respective gate circuits 75 and 76 to the B and A sides of the binary 59. These gate circuits comprise rectifiers 77, 78 pulse capacitors 79, 80, and control resistors 81, 82 connected respectively to the control conductors 66 and 67. In the marking condition of the binary 58, conductor 67 is at potential V3, and the binary 59 also being in the marking condition, the terminal 11 (Fig. 1) of this binary to which the rectifier 78 is connected is at potential V1 which is higher than V3. Rectifier 78 is therefore blocked and gate 76 is shut. Conductor 66 is at potential V4 and the terminal 12 (Fig. 1) of the binary 59 to which rectifier 77 is connected is at potential V2, higher than V4, so gate 75 is also shut. However, when a start signal is received and relay 64 changes over to space, binary 58 is changed over to the spacing condition, and the potentials of conductors 66 and 67 are interchanged. This opens gate 75 because now both sides of the rectifier 77 are nearly at the same potential and positive pulses can get through the gate. Gate 76 remains shut because the potential of conductor 67 has been reduced from V3 to V4.

Figure 5:
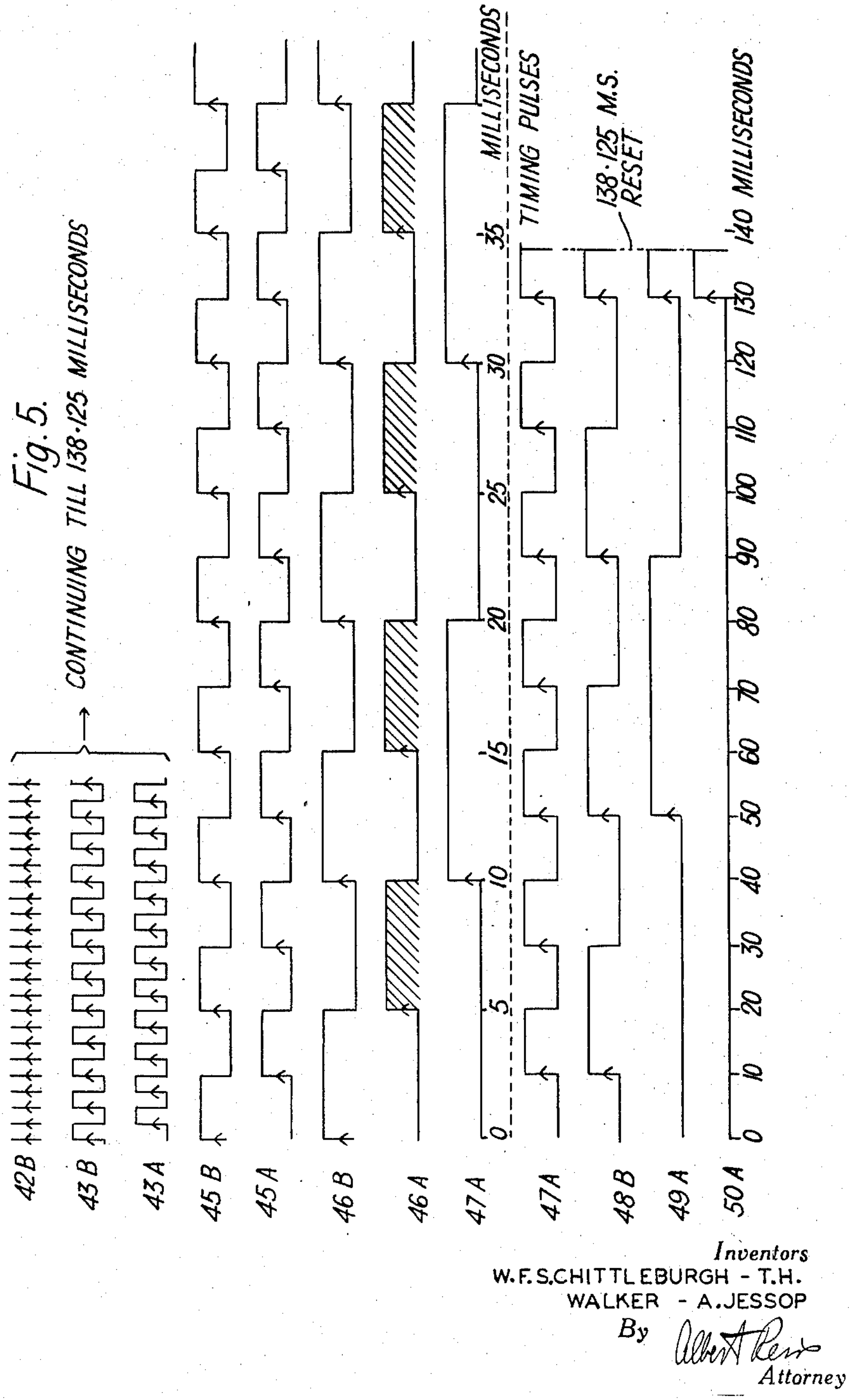
Fig. 5 shows graphical diagrams used in explaining the operation of Fig. 4.

Referring now to graph 47A in the lower group of Fig. 5, it will be seen that the timing pulses supplied from the A output of the binary 47 to the gates 75 and 76 occur at times 10, 30, 50 etc. milliseconds, and these pulses determine the timing of the regenerated signals. As soon as a start signal is received, the binary 58 is switched over to the A or spacing condition, and gate 75 is opened. The first trigger pulse arriving from binary 47 at 10 milliseconds then switches the binary 59 to the A or spacing condition and gate 75 is shut again. It should be pointed out that the transistor 83, the emitter contact of which is connected through the resistor 84 to the B side of the binary 59, is at this stage in the blocked condition and has no effect.

The A and B outputs of the binary 59 are respectively connected to the A and B sides of the binary 60 through pulse capacitors 85, 86 and rectifiers 87 and 88, which rectifiers are also connected to terminal 10 through equal resistors 89 and 90. Thus when the binary 59 is switched to the spacing condition at 10 milliseconds, a positive trigger pulse is applied to the B side of the binary 60 and switches it over to the A or spacing condition. The moving spring of the output relay contacts 38 is thereby changed over to the positive spacing source as explained with reference to Fig. 2. Thus it will be seen that 10 milliseconds after the receipt of the start signal, the contacts 38 will be switched over to the spacing condition.

If now the first code element of the character being received is a space, relay 64 remains in the spacing condition and both the gates 75 and 76 are shut. The trigger pulse at 30 milliseconds from the binary 47 thus cannot reach the binary 59 and has no effect. Thus the binary 60 and contacts 38 remain in the spacing condition. If, however, the first code elements is a mark, relay 64 changes back to the marking condition shown, and then the gate 76 is opened. The trigger pulse at 30 milliseconds therefore passes to the A side of the binary 59 and switches it back to the marking condition, thus shutting gate 76 again. The positive trigger pulse from the A output of the binary 59 then switches the binary 60 and contact 38 back to the marking condition.

It will be clear that any one of the following trigger pulses from the binary 47 will reverse the condition of the binary 59 only if during the preceding 20 milliseconds the relay 64 has changed over, and so the incoming transitions are repeated by the relay contact 38, but accurately timed by the pulses from binary 47, and with a delay of 10 milliseconds. When the code elements of the character have all been transmitted, the final stop or marking signal is received nominally 120 milliseconds after the start signal, and is retransmitted at 130 milliseconds.

The above description of the operation of the circuit assumes that there is no appreciable interference causing momentary operation of the relay 64. If this relay changes back again before the end of the 20 millisecond interval, the next timing pulse of course has no effect.

In order to restore the circuit to normal after receipt of the stop signal, the binaries 51 and 52 are used. The binary 52 is switched over to the A condition at 130 milliseconds by a trigger pulse from the A side of binary 50 (see graph 50A, Fig. 5). The A output of binary 52 is connected to the A side of the binary 57 (which is in the A condition) but no positive trigger pulse is produced by the binary 52. Both sides of the binary 51 are supplied with trigger pulses from the A output of binary 45 through a double gate 91 controlled by the A side of the binary 46 in the same way as gates 75 and 76. The trigger pulses from binary 45 occur at times 2.5, 7.5, 12.5 etc. milliseconds as can be seen from graph 45A, Fig. 5. Graph 46A shows that the gate 91 will be open during the periods 5 to 10, 15 to 20, 25 to 30 etc. milliseconds indicated by shading. Thus it is clear that the binary 51 can be switched only by alternate pulses from the A side of binary 45, that is, at times 7.5, 17.5, 27.5 etc. milliseconds. A control potential is applied from the A output of binary 51 to a gate 92 through which trigger pulses from the A side of binary 43 are applied to the A side of binary 52. The gate 92 is open only during the periods when the binary 51 is in the B condition, which will occur for 10 milliseconds after every fourth pulse from the binary 45 starting with the pulse at 17.5 milliseconds (see graph 45A, Fig. 5). During each of the periods when the gate 92 is open, pulses from the binary 43 are applied to the A side of the binary 52, but they will have no effect while the binary 52 is in the B condition. However, as already explained, it is switched to the A condition at 130 milliseconds. The gate 92 will be open for 10 milliseconds starting at 137.5 milliseconds. The trigger pulses from the A output of the binary 43 occur at intervals at 1.25 milliseconds, the first one being at 0.625 millisecond (see graph 43A, Fig. 5). It can be easily seen that the first trigger pulse from binary 43 after 137.5 milliseconds will be at 138.125 milliseconds, and this pulse will restore the binary 52 to the B condition. At the same time a trigger pulse will be supplied from the A output of the binary 52 to the A side of the binary 57, and this will restore it to the B condition, thereby unblocking the transistor 63 and applying the resetting potential to conductor 62. Thus all the binaries are restored to the B condition at 138.125 milliseconds, so stopping the counting chain. The circuit is now ready to receive the next start signal, which will not normally arrive before 140 milliseconds when the stop period is equal to one code element period. It will be evident that by suitable selection of pulses from the counting chain, the restoration of the circuit may be arranged to be at some other time than 138.125 milliseconds. This value is however convenient because it enables the circuit to be used when the stop period is one or one-and-a-half code element periods and also allow some margin in the first case for slightly fast running.

In order to deal with the false start condition, the binary 56 is provided. It is assumed that if the incoming start condition does not last for at least 5 milliseconds it is a false start. Trigger pulses from the A output of binary 46 are supplied to the B side of binary 56 through a gate 93 which is normally held open by the binary 55, the purpose of which will be described later. From graph 46A, Fig. 5, it will be seen that the first trigger pulse from the A output of binary 46 occurs at 5 milliseconds. This switches the binary 56 to the A condition, and a trigger pulse is thereby transmitted from the B output of the binary 56 through a gate 94 to the A side of the binary 57. As already explained, after receipt of the start signal, the binary 57 is switched to the A condition and the control conductor 67, which controls the gate 94, is reduced to potential V4 which shuts the gate 94. However, if the start condition lasts for less than 5 milliseconds, the gate 94 is opened again, because the potential of conductor 67 returns to the higher value V3, and the pulse at 5 milliseconds from the binary 56 now reaches the binary 57 and switches it back to the B condition, thus restoring the circuit to normal, as already explained, before the first timing pulse can be generated.

It will be understood that the criterion period of 5 milliseconds for the false start could be changed to some other value by suitably changing the point of connection of the gate 93 to the counting chain.

In order to provide for the insertion of an automatic stop signal, the binary 54 and transistor 83 are provided. The A output of the binary 54 is connected to the base electrode of the transistor 83, the collector electrode of which is connected to the negative source terminal 10, and the emitter electrode of which is connected through the control resistor 84 to the B side of the binary 59. The binary 54 being in the B condition, the potential of the base electrode of the transistor 83 will be positive to that of the emitter electrode and the transistor will therefore be cut off. However, the trigger pulse from the A output of the binary 50 at 130 milliseconds is applied through the gate 95 to the B side of the binary 54 and triggers it to the A condition. The binary 53 will have already been switched to the A condition in a manner to be explained later, and the gate 95 will be open. The potential of the base electrode of the transistor 83 is thereby made negative to the emitter electrode, so that the transistor becomes unblocked, and applies a negative control potential through the resistor 84 to the B side of the binary 59 and switches it to the B or marking condition whether or not a stop signal has been received. At 138.125 milliseconds, when the circuit is restored to normal as already explained, the binary 54 is restored to the B condition, and the transistor 83 is blocked again, thus removing the negative control potential from the binary 59, but leaving the binaries 59 and 60, and contacts 38, in the marking condition.

In order to deal with the long space condition, the binaries 53 and 55 are provided. In this condition, it is clearly necessary to prevent the automatic insertion of the stop signal, and therefore it is necessary to recognise the long space condition as such.

This recognition is based upon the fact that if a character is being transmitted, at least one marking condition will occur during the 130 millisecond period after the receipt of the start signal, and so, if no such marking condition occurs, the start signal is taken to be the beginning of a long space condition. After the arrival of the start signal, the binary 59 is in the A or spacing condition, and if a marking signal should subsequently arrive it will be switched back to the B or marking condition as already explained, so that a trigger pulse is generated at the A output, which pulse is supplied to the B side of the binary 53 as well as to the A side of the binary 60. The binary 53 is accordingly switched to the A condition, thus opening the gate 95 in time to allow the pulse at 130 milliseconds to pass from the A output of binary 50 to switch the binary 54 to the A condition, and insert the stop signal, as already explained. However, if no marking signal is received before 130 milliseconds, the binary 53 is not switched to the A conditon and so the gate 95 remains closed, and the insertion of the stop signal is prevented.

It will be understood that when the long space condition occurs, the circuit will be reset at 138.125 milliseconds in the manner already explained, so that all the binaries except 58, 59 and 60 will be restored to the B condition. At the end of the long space condition, a marking signal is received, and it is of course necessary to repeat this marking signal after the usual 10 milliseconds delay. The binary 58, on being restored to the marking condition, supplies a trigger pulse from the A output to the binary 57 and switches it over to the A condition, thus starting the counting chain in the manner already described. But since the binary 58 is now in the marking condition, the gate 94 will be open and the counting chain will be stopped at 5 milliseconds, as described above in connection with the false start condition. Accordingly no timing pulse can be produced at 10 milliseconds from the binary 47 for switching the binaries 59 and 60 back to the marking condition. To deal with this situation, the binary 55 is provided. It has already been pointed out that the binary 53 remains in the B condition during the period of a long space and thereby holds open the gate 96 from its A output. This permits a pulse at 130 milliseconds to pass from the A output of binary 50 to the B side of binary 55, thus switching it to the A condition and closing the gate 93, which prevents the stopping pulse at 5 microseconds from reaching the binary 56 from the A side of the binary 46. The counting chain therefore continues to operate until 10 milliseconds, when the first timing pulse from the A output of binary 47 appears and switches binaries 59 and 60 to the marking condition. A trigger pulse also appears at 10 milliseconds from the B output of binary 48 (see graph 48B, Fig. 5) and this pulse is applied to the B side of binary 56 and switches it over to the A condition, thus transmitting a pulse through the open gate 94 to the A side of the binary 57, and stopping the counting chain in the manner already described. A trigger pulse is also transmitted from the B output of the binary 56 to the A side of the binary 55, thus restoring it to the B condition and opening the gate 93. The circuit is now in the normal stop condition and ready to receive and generate the incoming character signals in the manner already described. It will be clear that the stopping operation at 10 milliseconds which occurs at the end of a long space condition does not affect the stopping operation at 5 milliseconds after a false start condition, because in the latter case, the counting chain is restored to normal before the stopping pulse at 10 milliseconds can be generated.

It may be mentioned that the pulse generator 61 and the two binaries 41, 42 are equivalent to a pulse generator providing the trigger pulses shown in graph 42B (Fig. 5) having a repetition frequency of 1,600 pulses per second, and as far as the operation of the circuit is concerned, the binaries 41 and 42 could have been omitted and the frequency of the pulse generator 61 changed to 1,600 pulses per second. But it will be seen that on receipt of the start signal, the repeater cannot begin to operate until the first pulse is received from the generator, and so a delay which may be practically equal to one period of the generator may occur. If the binaries 41 and 42 were omitted, the delay could be as much as 0.625 millisecond, which corresponds to an error of about 3 percent at 50 bauds. By including the binaries 41 and 42, the maximum error is reduced to less than 1 percent, since the first pulse from the B output of binary 42 occurs at substantially the same time as the first pulse from the generator 61. Evidently the maximum error may be further reduced by including additional binaries (not shown) between the generator 61 and the binary 41, and increasing the frequency of the generator 61 accordingly.

It should be pointed out that while the regenerative repeater which has been described makes use of the absence of a marking signal following a start signal to recognise the long space condition, it will normally transmit an "all-space" character because of the stop signal which occurs at the end of the character code group, which is a marking signal and will switch binaries 59 and 60 back to the marking condition, at the same time switching over the binary 53 to the A condition to insert the automatic stop signal. This all occurs at 130 milliseconds, and it is immaterial that the normal and automatic stop signals substantially coincide. However, if the incoming stop signal of an "all-space" character should happen to be lost on account of fading or interference, the repeater will clearly assume the long space condition, and there will be some confusion at the receiving end, which, however will be rectified at the end of the next character, and at the most two characters will be lost or mutilated. This particular condition will be of rare occurrence, and if the circuit is subject to serious fading and interference no arrangement can be expected to operate without some loss or mutilation of characters.

It will be seen that the automatic insertion of the stop signal at the end of each character period (except in the special case of the long space) ensures as quickly as possible the effective resynchronisation of the receiving apparatus after the loss of a stop signal due to fading. In the absence of the stop signal, the receiving apparatus would take the next received marking signal as a stop signal, and if the characters are transmitted in close succession, the confusion might not be cleared up until several characters had been mutilated or lost.

While the principles of the invention have been described above in connection with specific embodiments, and particular modifications thereof, it is to be clearly understood that this description is made only by way of example and not as a limitation on the scope of the invention.

What we claim is:

1. A telegraph regenerative repeater for start-stop binary code systems, comprising means for repeating at correctly timed instants an incoming code group of signal transitions representing a character to be transmitted, means for inserting an outgoing stop signal at the proper time after the re-transmission of the start signal, irrespective of whether or not an incoming stop signal is received, means for detecting the presence of marking signals during the period between the instant of the start signal and the said proper time, and means operating in response to the absence of any marking signals during the last-mentioned period for preventing the insertion of the said outgoing stop signal.

2. A telegraph regenerative repeater for start-stop binary code systems, comprising means for retransmitting at correctly spaced instants incoming signal transitions representing a character to be transmitted according to the code, and arrangements including means for detecting the presence of a marking signal during the character period following the receipt of a start signal, and means responsive to the detection of the said marking signal for inserting an outgoing stop signal at the proper time irrespective of whether or not an incoming stop signal is received.

3. A telegraph regenerative repeater for start-stop systems in which a character is transmitted during a period divided into $n+1$ equal element periods, consisting of $n$ code element periods, during which the telegraph circuit may be in the marking or spacing condition according to the code, preceded by a start period during which the circuit is in the spacing condition, comprising generating means for producing timing pulses for controlling the timing of the outgoing regenerated signals, means operating in response to a start signal for starting the said generating means, means arranged to stop the said generating means only if the start condition persists for less than a given fraction of an element period, means arranged to insert an outgoing stop signal at the proper time, irrespective of whether or not an incoming stop signal is received, only if the said start condition lasts for more than the said given fraction and is also followed by at least one marking period before the said proper time, means for preventing the insertion of the said outgoing stop signal if the start signal commences a long space condition wherein no such marking period follows the start signal, and means for stopping the said generating means before the arrival of the next start signal.

4. A repeater according to claim 3 comprising means responsive to an incoming stop signal which terminates a long space condition for starting the generating means, controlled by the generating means for transmitting an outgoing stop signal, and means for stopping the generating means directly the said outgoing stop signal is transmitted.

5. A repeater according to claim 2 in which the means for retransmitting the incoming signal transitions comprises a counting chain adapted to produce a train of timing pulses having a repetition period equal to an element period of the code, means responsive to the arrival of the start signal for starting the operation of the counting chain, a bi-stable two-condition trigger device arranged to apply marking or spacing potential to an outgoing line according as the said device is in the marking or spacing condition, and means controlled by the incoming signals for applying the timing pulses to the said trigger device in such manner that a timing pulse reverses the condition of the said device only if the incoming signal condition has reversed since the arrival of the preceding timing pulse.

6. A repeater according to claim 5 in which the said arrangements comprise a second bi-stable two-condition trigger device adapted to be switched from the normal to the operated condition in response to the said marking signal, thereby opening a gate circuit, a third bi-stable two-condition trigger device adapted to be switched from the normal to the operated condition by a timing pulse which occurs at the said proper time and which is applied to the third trigger device through the said gate current, the said third trigger device being adapted, when in the operated condition, to cause a potential to be applied to the first-mentioned trigger device for switching it to the marking condition, the arrangement being such that when no marking signal is received, the gate circuit is shut, thereby preventing the second trigger device from being switched by the timing pulse.

7. A repeater according to claim 5 comprising means for deriving from the said counting chain a terminating pulse at a time not more than half an element period after the said proper time, and means for applying the terminating pulse to stop the operation of the counting chain and to restore the said second and third trigger devices to the normal condition.

8. A repeater according to claim 5 comprising means for deriving from the counting chain a first stopping pulse at a time one quarter of an element period after the arrival of the start signal, and means for applying the said first stopping pulse to stop the operation of the counting chain only if the start condition lasts less than one quarter of an element period.

9. A repeater according to claim 8 comprising means for deriving from the counting chain a second stopping pulse at a time one half an element period after the arrival of an incoming stop signal which terminates a long space condition, means for preventing the first stopping pulse from stopping the operation of the counting chain, means for retransmitting the stop signal, and means for applying the second stopping pulse to stop the operation of the counting chain.

References Cited in the file of this patent

UNITED STATES PATENTS

| | | |
|---|---|---|
| 2,705,261 | Canfora et al. | Mar. 29, 1955 |
| 2,752,425 | Dain | June 26, 1956 |
| 2,762,863 | Wheeler et al. | Sept. 11, 1956 |